Patented Sept. 25, 1951

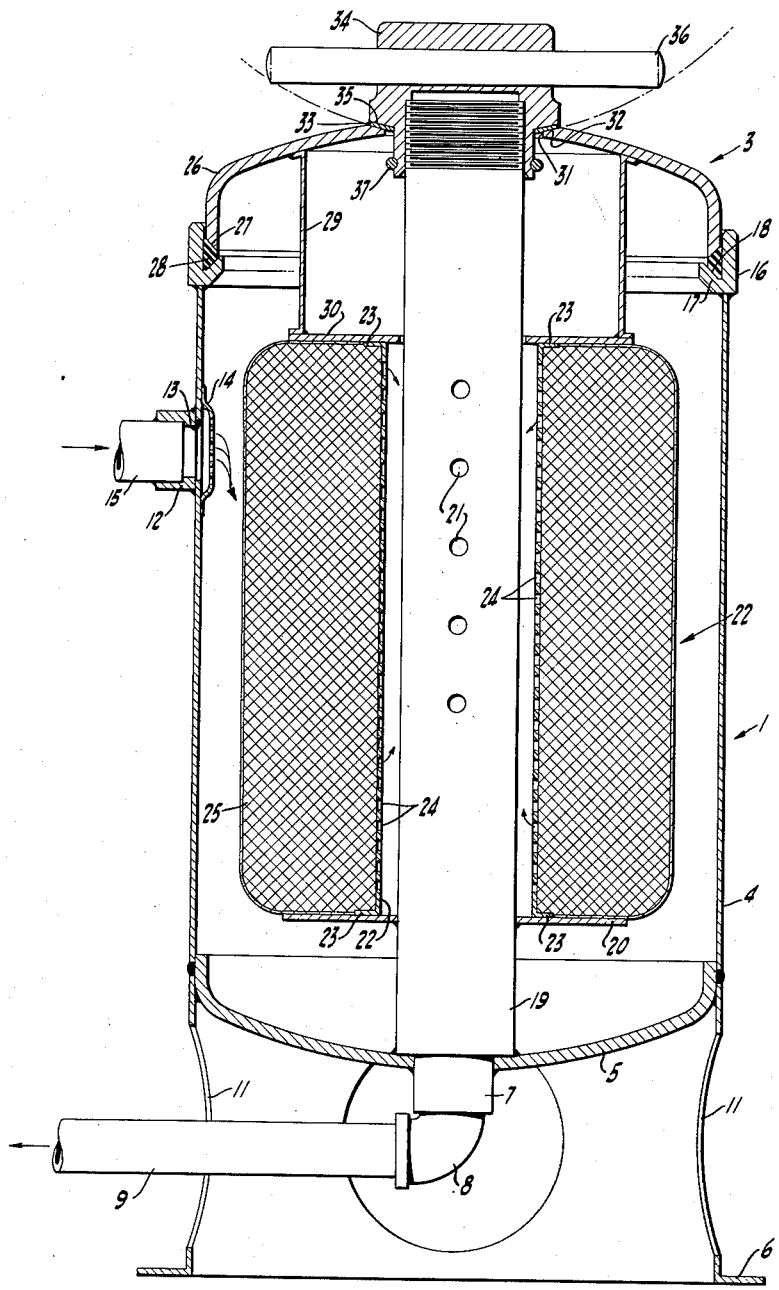

2,569,186

UNITED STATES PATENT OFFICE 2,569,186

FILTER ASSEMBLY

Frank R. Ogilvie, Glendora, Calif., assignor to Engine Life Products Corporation, El Monte, Calif., a corporation of California Application April 4, 1949, Serial No. 85,362

2 Claims. (Cl. 210—183)

This invention relates to and in general has for its object the provision of a pressure filter unit including a casing sub-assembly, a filter cell or cartridge sub-assembly, and a cover or head sub-assembly so designed that these three sub-assemblies may be readily assembled and sealed to each other irrespective of minor inaccuracies in construction.

More specifically the object of this invention is the provision of a filter unit of the character above described and wherein a cylindrical filter cartridge is mounted over a central filtrate tube extending upwardly from and formed integral with the bottom of a casing, wherein the cartridge is clamped between a plate secured to the lower end of the filtrate tube and an opposed plate suspended from and formed integral with a quickly detachable upwardly dished casing cover; wherein the peripheral edge of the cover is sealed to the upper peripheral edge of the casing through the medium of a resilient gasket; and wherein the cover is fastened to the casing by a nut threaded to the upper end of the filtrate tube and provided with a downwardly convex spheroidal shoulder arranged to seat on a gasket accommodated on a central upwardly concave spheroidal seat formed on the upper face of the cover.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

The single figure of the drawing accompanying and forming a part of this specification is a vertical mid-section of a filter unit embodying the objects of my invention.

The unit shown in this figure includes a casing sub-assembly generally designated by the reference numeral 1, a filter cell or cartridge sub-assembly generally designated by the reference numeral 2, and a casing cover sub-assembly generally designated by the reference numeral 3.

The filter assembly 1 includes a cylindrical drum or shell 4 having a dished bottom 5 and a supporting bracket 6 welded thereto. Welded to and extending through the bottom 5 coaxially therewith is a filtrate outlet nipple 7 to which is threaded an elbow 8 connected to a filtrate outlet pipe 9, the pipe 9 passing through one of several cut-outs 11 formed in the bracket 6. Welded to the shell 4 is an oil or slurry inlet nipple 12 communicating with an opening 13 formed in the shell and over which is mounted a drainage screen 14. Threaded to the outer end of the nipple 12 is an oil or slurry inlet pipe 15. To the upper peripheral edge of the shell 4 is welded a ring 16 provided with an inwardly and upwardly extending flange 17 forming a downwardly converging or wedge-shaped channel 18. Also included as a part of the casing sub-assembly is a filtrate tube 19 welded to the bottom 5 coaxially with the shell 4 and its outlet nipple 7, and provided adjacent its lower end with a supporting plate 20 and intermediate its ends with filtrate intake openings 21. As shown in the drawing, the upper end of the filtrate tube 19 is threaded and extends substantially above the upper peripheral edge of the shell 4.

The filter cell or cartridge sub-assembly 2 includes a spool 22 provided at either end with outwardly extending flanges 23 and formed with openings 24 throughout its entire area. Mounted on the spool 22 is a filter medium 25 of any desired construction and texture, the lower end of this filter medium being in surface engagement with the upper face of the plate 20.

The cover sub-assembly includes an upwardly dished cap or cover 26 having a beveled peripheral edge 27 arranged to seat on a resilient elastomer gasket 28 accommodated within the channel 18. Welded to and depending from the cover 26 is a flanged ring 29 to which is welded a plate 30 circumscribing the upper end of the filtrate tube 19 with substantial clearance and arranged to have surface engagement with the upper end of the filter medium 25. The cap 26 is formed with a central opening 31 and with a spheroidal seat 32 circumscribing the opening 31 and arranged to receive a gasket 33.

Threaded to the upper end of the filtrate tube 19 with its lower end extending through the opening 31 is a nut 34. In this connection it is to be noted the tube 19 has substantial clearance with the cover 26. Formed on the nut 34 intermediate its ends is a spheroidal shoulder 35 complementary to the spheroidal seat formed on the upper surface of the cover. Extending diametrically through the upper end of the nut 34 is a wrench rod 36 for applying and removing the nut to and from the upper end of the filtrate tube 19. To prevent the complete removal of the nut 34 from the cover 26, the lower end of the nut is provided with an annular groove for the reception of a wire clip ring 37.

As a result of this construction, it will be seen that any inaccuracies in the alignment of the filtrate tube 19 with respect to the axis of the shell 4 is immaterial in so far as effecting a seal between the cover 26 and the upper end of the shell and between the nut 34 and the upper face of the cover, for due to the spheroidal form of the seat between the nut and the cover, and the clearances between the tube, nut and plate 30, the cover is free to align itself and effect a fluid tight seal with respect both to the nut and to the upper peripheral edge of the shell. It should also be noted that an increase in the fluid pressure within the shell or casing serves to effect a tighter seal between the beveled edge 27 of the cap and the inclined edge of the gasket 28. A similar effect results at the seal between the cap and the nut. When the cartridge 25 has become spent by being plugged or blinded with solids, it can be readily replaced with a new cartridge by simply removing the nut 34 and cover 26, lifting the old cartridge from the filtrate tube 19, substituting a new cartridge in its place, and then reconnecting and sealing the cover to the casing 4.

The operation of a unit of this character hardly needs explanation, for it functions in accordance with usual practice. Oil to be filtered is delivered to the shell through the intake inlet nipple 12 whereupon the oil is filtered by passing through the cartridge 25, enters the filtrate tube through the openings 21, and then passes out of the unit through the filtrate nipple 7.

I claim:

1. A filter comprising: a cylindrical container closed at one end by an end wall and open at its opposite end, said container being formed with a slurry inlet and said end wall being provided with a filtrate outlet coaxial with said container; a filtrate tube disposed within said container coaxially therewith, one end of said tube being sealed to said end wall in communication with said filtrate outlet; a filter cartridge supporting plate fastened to said filtrate tube adjacent said end wall; a cylindrical filter cartridge mounted on said filtrate tube with one end thereof in engagement with said supporting plate; a quickly removable cover sealed to and over the open end of said container by a resilient elastomer gasket, said cover being formed with a central circular opening circumscribed by a spheroidal seat; a clamping plate mounted on the inner face of said cover and circumscribing said filtrate tube with substantial clearance, said clamping plate being arranged to engage one end of said filter cartridge; and a nut threaded to the outer end of said filtrate tube, said nut being formed with a spheroidal shoulder overlying said spheroidal seat and arranged for sealing engagement with a gasket disposed on said seat.

2. A filter comprising: a cylindrical container closed at one end by an end wall and open at its opposite end, said container being provided with a filtrate outlet substantially coaxial with said container; a filtrate tube disposed within said container coaxially therewith; one end of said tube being sealed to said end wall in communication with said filtrate outlet; a filter cartridge supporting plate fastened to said filtrate tube adjacent said end wall; a cylindrical filter cartridge mounted on said filtrate tube in engagement with said supporting plate; a channel, V-shape in cross-section, formed integral with the open end of said container; a resilient wedge-shaped gasket disposed in said channel; a quickly removable cover disposed over the open end of said container and having an outwardly inclined peripheral edge seated on said gasket, said cover being formed with a central circular opening circumscribed by an inwardly concave spheroidal seat; a filter cartridge engaging plate rigidly suspended from said cover in engagement with one end of said cartridge; and a nut threaded to the outer end of said filtrate tube, said nut being formed with a downwardly convex spheroidal shoulder overlying said spheroidal seat and arranged for sealing engagement with a gasket disposed on said seat.

FRANK R. OGILVIE.

REFERENCES CITED

The following references are of record in the file of this patent:

UNITED STATES PATENTS

| Number | Name | Date |
|---|---|---|
| 942,171 | Ecaubert | Dec. 7, 1909 |
| 1,544,004 | Henderson | June 30, 1925 |
| 1,620,983 | Nichols | Mar. 15, 1927 |
| 1,802,557 | Hight | Apr. 28, 1931 |
| 1,871,810 | Lester | Aug. 16, 1932 |
| 2,156,329 | Beck | May 2, 1939 |
| 2,325,399 | Houston | July 27, 1943 |
| 2,342,948 | Long | Feb. 29, 1944 |
| 2,454,030 | Besore | Nov. 16, 1948 |